United States Patent
Torita et al.

(10) Patent No.: US 11,909,049 B2
(45) Date of Patent: Feb. 20, 2024

(54) POSITIVE ELECTRODE, NON-AQUEOUS ELECTROLYTE SECONDARY BATTERY, AND METHOD OF PRODUCING POSITIVE ELECTRODE

(71) Applicant: TOYOTA JIDOSHA KABUSHIKI KAISHA, Toyota (JP)

(72) Inventors: Koji Torita, Nagoya (JP); Takuya Asari, Kobe (JP); Akihiro Ochiai, Toyonaka (JP); Yusuke Fukumoto, Toyonaka (JP); Naoyuki Wada, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/589,281

(22) Filed: Oct. 1, 2019

(65) Prior Publication Data
US 2020/0119361 A1    Apr. 16, 2020

(30) Foreign Application Priority Data
Oct. 10, 2018  (JP) ................................. 2018-191807

(51) Int. Cl.
*H01M 4/66*    (2006.01)
*H01M 10/0525*    (2010.01)
(Continued)

(52) U.S. Cl.
CPC ............. *H01M 4/661* (2013.01); *C22C 21/00* (2013.01); *H01M 4/04* (2013.01); *H01M 4/131* (2013.01);
(Continued)

(58) Field of Classification Search
CPC ........ H01M 4/04; H01M 4/661; H01M 4/131; H01M 4/1391; H01M 4/505; H01M 4/525; H01M 10/0525; C22C 21/10
See application file for complete search history.

(56) References Cited

U.S. PATENT DOCUMENTS

| | | | |
|---|---|---|---|
| 6,787,266 B1 * | 9/2004 | Hashimoto | H01M 4/667 429/245 |
| 2004/0191633 A1 * | 9/2004 | Johnson | H01M 10/052 429/231.95 |

(Continued)

FOREIGN PATENT DOCUMENTS

| | | |
|---|---|---|
| CN | 110380055 A | 10/2019 |
| JP | 2000048822 A | 2/2000 |

(Continued)

OTHER PUBLICATIONS

Kono et al., JP 2008-103132, 2008, machine translation.*

*Primary Examiner* — Cynthia H Kelly
*Assistant Examiner* — Niara Trant
(74) *Attorney, Agent, or Firm* — Dickinson Wright, PLLC

(57) ABSTRACT

A positive electrode includes at least a positive electrode current collector and a positive electrode active material layer. The positive electrode active material layer is disposed on a surface of the positive electrode current collector. The positive electrode current collector includes an aluminum foil and an aluminum hydrated oxide film. The aluminum hydrated oxide film covers a surface of the aluminum foil. The aluminum hydrated oxide film has a thickness not smaller than 50 nm and not greater than 500 nm. The aluminum hydrated oxide film contains a plurality of types of aluminum hydrated oxides. The ratio of boehmite to the plurality of types of aluminum hydrated oxides is not lower than 20 mol % and not higher than 80 mol %.

4 Claims, 7 Drawing Sheets

(51) Int. Cl.
*H01M 4/04* (2006.01)
*C22C 21/00* (2006.01)
*H01M 4/1391* (2010.01)
*H01M 4/505* (2010.01)
*H01M 4/525* (2010.01)
*H01M 4/131* (2010.01)

(52) U.S. Cl.
CPC ......... *H01M 4/1391* (2013.01); *H01M 4/505* (2013.01); *H01M 4/525* (2013.01); *H01M 10/0525* (2013.01)

(56) References Cited

U.S. PATENT DOCUMENTS

| | | | |
|---|---|---|---|
| 2015/0004464 A1* | 1/2015 | Okuno | H01M 10/0525 |
| | | | 429/143 |
| 2017/0250400 A1* | 8/2017 | Al | H01M 4/133 |
| 2018/0083286 A1* | 3/2018 | Ise | H01M 10/36 |
| 2018/0277815 A1* | 9/2018 | Sung | H01M 50/446 |
| 2019/0319273 A1 | 10/2019 | Torita et al. | |
| 2020/0020910 A1* | 1/2020 | Nam | H01M 50/429 |
| 2020/0035971 A1* | 1/2020 | Kim | H01M 10/0583 |

FOREIGN PATENT DOCUMENTS

| | | | |
|---|---|---|---|
| JP | 2003157852 A | 5/2003 | |
| JP | 2008103132 A | 5/2008 | |

* cited by examiner

POSITIVE ELECTRODE, NON-AQUEOUS ELECTROLYTE SECONDARY BATTERY, AND METHOD OF PRODUCING POSITIVE ELECTRODE

This nonprovisional application claims priority to Japanese Patent Application No. 2018-191807 filed on Oct. 10, 2018, with the Japan Patent Office, the entire contents of which are hereby incorporated by reference.

BACKGROUND

Field

The present disclosure relates to a positive electrode, a non-aqueous electrolyte secondary battery, and a method of producing a positive electrode.

Description of the Background Art

Japanese Patent Laying-Open No. 2008-103132 discloses a method of enhancing a film formation rate of an aluminum hydrated oxide film.

SUMMARY

Conventionally, an aluminum (Al) foil has been used as a positive electrode current collector of a non-aqueous electrolyte secondary battery (which may be simply called "battery" hereinafter). To a surface of the positive electrode current collector, a positive electrode paste is applied, followed by drying, and thereby a positive electrode active material layer is formed. In this way, a positive electrode is produced.

Japanese Patent Laying-Open No. 2008-103132 discloses a configuration in which a hydrated oxide film (which is called "aluminum (Al) hydrated oxide film" herein) is formed on a surface of an Al foil, thereby improving, among others, the adhesion between a positive electrode current collector and a positive electrode active material layer and the alkaline resistance of the positive electrode current collector.

According to a novel finding of the present disclosure, an Al hydrated oxide film may have an effect of mitigating heat generation occurring upon an external input. The "external input" refers to an abnormal condition of a battery in which a sharp, conductive object passes through the casing (namely, the housing of the battery) and enters inside the battery. After entering inside the battery, the sharp object may pass through the positive electrode and the negative electrode, potentially resulting in a short circuit between the positive electrode and the negative electrode and heat generation within the battery. The external input is simulated by a nail penetration test, for example.

Typically, the electrical resistance of a positive electrode active material layer is higher than that of an Al foil (positive electrode current collector). Therefore, it is considered that, when an external input occurs and the positive electrode active material layer comes into contact with the negative electrode (the counter electrode), a possible short-circuit current flow is not large.

However, an impact of an external input can force the positive electrode active material layer to come off the Al foil and thereby make the Al foil exposed. When this occurs, the exposed part of the Al foil can come into direct contact with the negative electrode. A direct contact of the Al foil with the negative electrode can cause a large short-circuit current. It is because the Al foil has a low electrical resistance. When a large short-circuit current flows, heat generation within the battery can increase.

It is considered that the electrical resistance of the Al hydrated oxide film is higher than that of the Al foil. It is also considered that the Al hydrated oxide film is less likely to come off the Al foil. Therefore, it is considered that the Al hydrated oxide film formed on a surface of the Al foil mitigates the Al foil from coming into direct contact with the negative electrode in case an external input occurs and the positive electrode active material layer comes off; in other words, it is considered that heat generation occurring upon an external input is mitigated.

Disposing an Al hydrated oxide film, however, can increase battery resistance. Depending on the composition of the Al hydrated oxide film, the heat-generation-mitigating effect can be decreased.

An object of the present disclosure is to mitigate heat generation occurring upon an external input while mitigating a rise in battery resistance.

In the following, the technical structure and the effects according to the present disclosure are described. It should be noted that the action mechanism according to the present disclosure includes presumption. Therefore, the scope of claims should not be limited by whether or not the action mechanism is correct.

[1] A positive electrode according to the present disclosure is a positive electrode for a non-aqueous electrolyte secondary battery. The positive electrode includes at least a positive electrode current collector and a positive electrode active material layer. The positive electrode active material layer is disposed on a surface of the positive electrode current collector. The positive electrode current collector includes an aluminum foil and an aluminum hydrated oxide film. The aluminum hydrated oxide film covers a surface of the aluminum foil. The aluminum hydrated oxide film has a thickness not smaller than 50 nm and not greater than 500 nm. The aluminum hydrated oxide film contains a plurality of types of aluminum hydrated oxides. The ratio of boehmite to the plurality of types of aluminum hydrated oxides is not lower than 20 mol % and not higher than 80 mol %.

A typical Al hydrated oxide film consists essentially of boehmite ($\alpha\text{-}Al_2O_3 \cdot H_2O$). An Al hydrated oxide film consisting of boehmite has a double-layer structure. More specifically, this type of Al hydrated oxide film has a dense layer and a needle layer. The dense layer is a lower layer of the Al hydrated oxide film. The dense layer is densely packed. The needle layer is an upper layer of the Al hydrated oxide film. The needle layer consists of needle crystals. The needle layer is loosely packed compared to the dense layer.

The dense layer tends to have a poor flexibility. Therefore, when the dense layer deforms upon an external input, the dense layer tends to crack. The cracks can expose the Al foil.

The Al hydrated oxide film according to the present disclosure contains a plurality of types of Al hydrated oxides. The ratio of boehmite to the plurality of types of Al hydrated oxides is not lower than 20 mol % and not higher than 80 mol %. In other words, the Al hydrated oxide film according to the present disclosure contains an Al hydrated oxide other than boehmite in an amount not lower than 20 mol % and not higher than 80 mol %.

The presence of the Al hydrated oxide other than boehmite contained in the Al hydrated oxide film introduces a structural defect into the Al hydrated oxide film. It is considered that the structural defect inhibits dense layer formation from occurring and allows needle layer formation to occur preferentially, causing an increase in the flexibility of the Al hydrated oxide film. It is considered that, as the flexibility of the Al hydrated oxide film thus increases, exposure of the Al foil occurring upon an external input is mitigated. In other words, it is considered that heat generation occurring upon an external input is mitigated.

With the boehmite ratio being higher than 80 mol %, it is considered that dense layer formation proceeds and causes a decrease in the flexibility of the Al hydrated oxide film. With the boehmite ratio being lower than 20 mol %, the influence of components other than boehmite increases and can cause a decrease in the flexibility.

Examples of the Al hydrated oxide other than boehmite ($\alpha$-$Al_2O_3$·$H_2O$) may include diaspore ($\beta$-$Al_2O_3$·$H_2O$), bayerite ($\beta$-$Al_2O_3$·$3H_2O$), and gibbsite ($\alpha$-$Al_2O_3$·$3H_2O$).

The thickness of the Al hydrated oxide film is not smaller than 50 nm and not greater than 500 nm. With the thickness being smaller than 50 nm, the heat-generation-mitigating effect can decrease. With the thickness being greater than 500 nm, battery resistance can increase to a non-negligible extent.

[2] The aluminum hydrated oxide film may have a thickness not greater than 150 nm. With this thickness, a decrease in battery resistance is expected.

[3] The ratio of boehmite to the plurality of types of aluminum hydrated oxides may be not lower than 30 mol % and not higher than 50 mol %. With this ratio, an enhancement in the heat-generation-mitigating effect is expected.

[4] A non-aqueous electrolyte secondary battery according to the present disclosure includes at least the positive electrode according to any one of [1] to [3] above, a negative electrode, and a non-aqueous electrolyte. In the battery according to the present disclosure, heat generation occurring upon an external input is expected to be small.

[5] A method of producing a positive electrode according to the present disclosure is a method of producing a positive electrode for a non-aqueous electrolyte secondary battery.

The method of producing a positive electrode includes at least (A), (B), and (C) below:

(A) preparing an aluminum foil;

(B) forming an aluminum hydrated oxide film on a surface of the aluminum foil to produce a positive electrode current collector; and (C) forming a positive electrode active material layer on a surface of the positive electrode current collector to produce a positive electrode.

The aluminum hydrated oxide film includes a plurality of types of aluminum hydrated oxides. The ratio of boehmite to the plurality of types of aluminum hydrated oxides is not lower than 20 mol % and not higher than 80 mol %.

By the method of producing a positive electrode according to the present disclosure, the positive electrode according to [1] above may be produced.

[6] The aluminum hydrated oxide film may be formed by hydrothermal treatment. By changing the treatment temperature in the hydrothermal treatment, the boehmite ratio may be adjusted. By changing the treatment duration of the hydrothermal treatment, the thickness of the Al hydrated oxide film may be adjusted.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. However, the description below does not limit the scope of claims. For instance, the present embodiment is described below taking a lithium-ion secondary battery as an example although a lithium-ion secondary battery is merely an example of a non-aqueous electrolyte secondary battery according to the present embodiment. As long as it includes a non-aqueous electrolyte, the non-aqueous electrolyte secondary battery according to the present embodiment is not limited to a lithium-ion secondary battery. The non-aqueous electrolyte secondary battery according to the present embodiment may be a sodium-ion secondary battery, for example.

<Positive Electrode>

Figure 1:
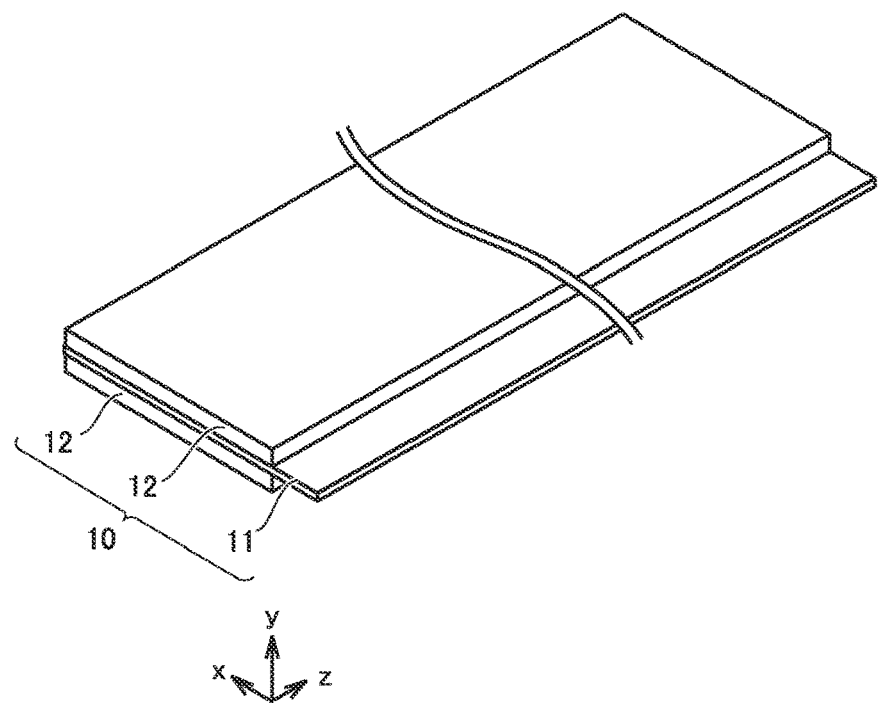
FIG. 1 is a schematic view illustrating the structure of a positive electrode according to the present embodiment.

FIG. 1 is a schematic view illustrating the structure of a positive electrode according to the present embodiment.

A positive electrode 10 is a positive electrode for a non-aqueous electrolyte secondary battery. The non-aqueous electrolyte secondary battery is described below in detail. Positive electrode 10 is in sheet form. Positive electrode 10 includes at least a positive electrode current collector 11 and a positive electrode active material layer 12. Positive electrode active material layer 12 is disposed on a surface of positive electrode current collector 11. Positive electrode active material layer 12 may be disposed on only one side of positive electrode current collector 11. Positive electrode active material layer 12 may be disposed on both sides of positive electrode current collector 11. The part of positive electrode current collector 11 protruding from positive electrode active material layer 12 in the x-axis direction in FIG. 1 may be used for connection to a positive electrode terminal 91 (described below).

<<Positive Electrode Current Collector>>

Figure 2:
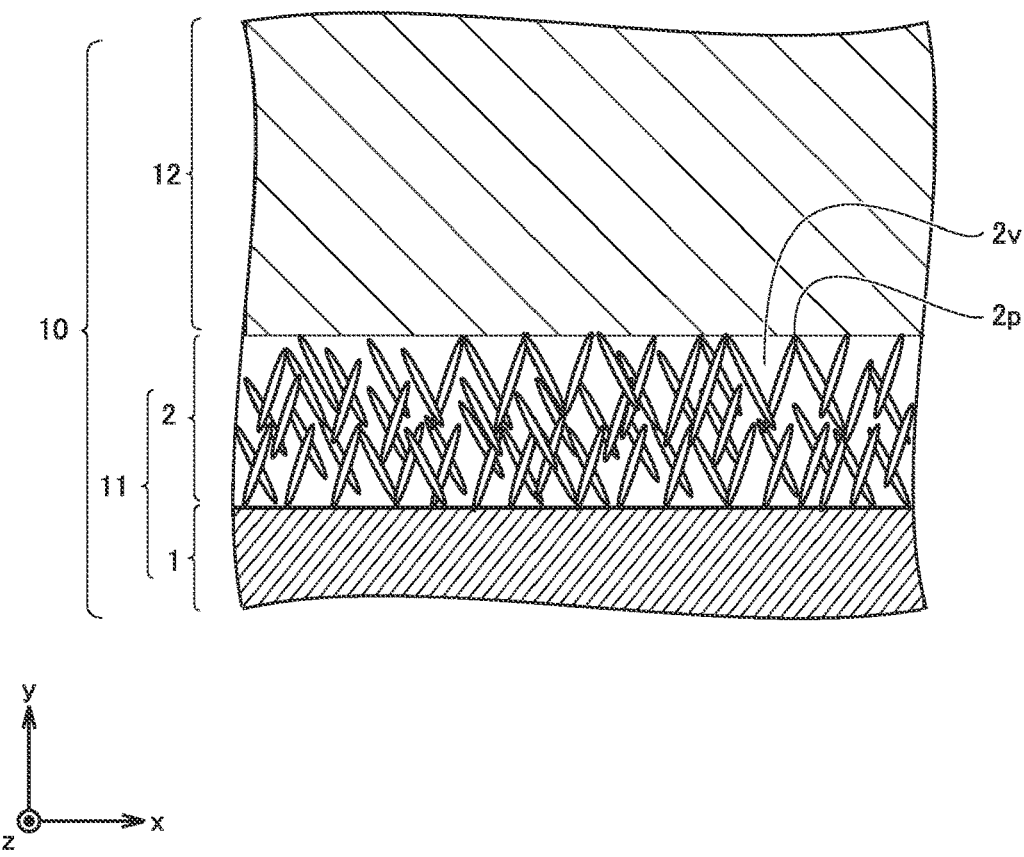
FIG. 2 is a conceptual sectional view illustrating the structure of the positive electrode according to the present embodiment.

FIG. 2 is a conceptual sectional view illustrating the structure of the positive electrode according to the present embodiment.

FIG. 2 conceptually illustrates a cross section of positive electrode 10 in a thickness direction. Positive electrode current collector 11 includes an Al foil 1 and an Al hydrated oxide film 2.

(Aluminum Foil)

Al foil 1 may be a pure Al foil, for example. Al foil 1 may be an Al alloy foil. Al foil 1 may contain Al in an amount not lower than 99 mass %, for example. Al foil 1 may contain, for example, a trace amount of impurities and the like that are inevitably entrapped during production. Al foil 1 may contain, for example, an alloying element that is intentionally added. The alloying element may be at least one selected from the group consisting of silicon (Si), iron (Fe), copper (Cu), manganese (Mn), magnesium (Mg), zinc (Zn), and titanium (Ti), for example.

As Al foil 1, a sheet of a material or materials specified by Alloy Nos. 1085, 1070, 1050, 1N30, 1100, 3003, 3004, 8021, and/or 8079 in "JIS H 4160: Aluminium and aluminium alloy foils" may be used, for example. The thickness of Al foil 1 may be not smaller than 5 μm and not greater than 50 μm, for example. The thickness of Al foil 1 may be not smaller than 10 μm and not greater than 20 μm, for example.

(Aluminum Hydrated Oxide Film)

Al hydrated oxide film 2 covers a surface of Al foil 1. Desirably, Al hydrated oxide film 2 covers practically the entire surface of Al foil 1. However, as long as heat generation occurring upon an external input can be mitigated, part of a surface of Al foil 1 may be not covered with Al hydrated oxide film 2.

Al hydrated oxide film 2 may consist essentially of a needle layer. The needle layer consists of needle crystals. Al hydrated oxide film 2 may include a dense layer. Al hydrated oxide film 2 is porous. Al hydrated oxide film 2 may have a porosity of about 45 to 55%, for example.

(Composition)

Al hydrated oxide film 2 contains a plurality of types of Al hydrated oxides. The ratio of boehmite to the plurality of types of Al hydrated oxides is not lower than 20 mol % and not higher than 80 mol %. The presence of an Al hydrated oxide other than boehmite contained in Al hydrated oxide film 2 introduces a structural defect into Al hydrated oxide film 2. It is considered that the structural defect inhibits dense layer formation from occurring and allows needle layer formation to occur preferentially, causing an increase in the flexibility of Al hydrated oxide film 2.

With the boehmite ratio being higher than 80 mol %, it is considered that dense layer formation proceeds and causes a decrease in the flexibility of Al hydrated oxide film 2. With the boehmite ratio being lower than 20 mol %, the influence of components other than boehmite increases and can cause a decrease in the flexibility.

The Al hydrated oxide other than boehmite ($\alpha$-$Al_2O_3$·$H_2O$), thus contained in Al hydrated oxide film 2, may include Al, oxygen (O), and hydroxide ions ($OH^-$). The Al hydrated oxide other than boehmite ($\alpha$-$Al_2O_3$·$H_2O$) may be at least one selected from the group consisting of diaspore ($\beta$-$Al_2O_3$·$H_2O$), bayerite ($\beta$-$Al_2O_3$·$3H_2O$), and gibbsite ($\alpha$-$Al_2O_3$·$3H_2O$), for example.

The ratio of boehmite to the plurality of types of Al hydrated oxides may be not higher than 70 mol %, for example. The ratio of boehmite to the plurality of types of Al hydrated oxides may be not lower than 30 mol % and not higher than 50 mol %. With this ratio, an enhancement in the heat-generation-mitigating effect is expected.

(Method of Measuring Boehmite Ratio)

Figure 3:
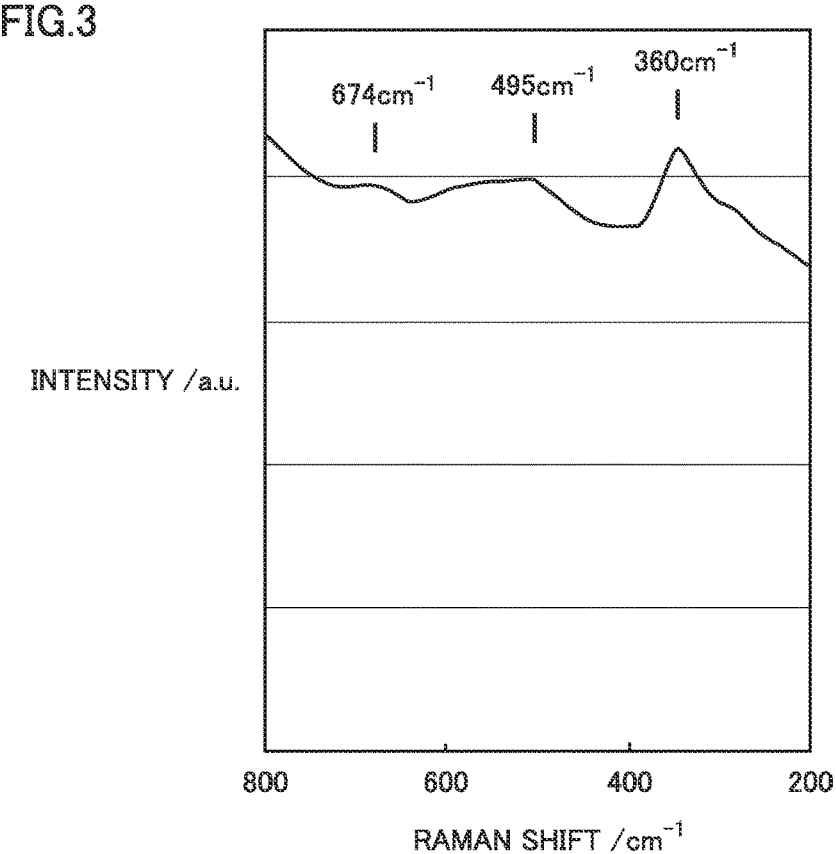
FIG. 3 illustrates a Raman spectrum of an aluminum hydrated oxide film.

FIG. 3 illustrates a Raman spectrum of the aluminum hydrated oxide film.

The boehmite ratio is determined from a Raman spectrum of Al hydrated oxide film 2. It is considered that the Raman spectrum of Al hydrated oxide film 2 includes a peak unique to boehmite. For instance, it is considered that the peak at or near 674 $cm^{-1}$, the peak at or near 495 $cm^{-1}$, and the peak at or near 360 $cm^{-1}$ are unique to boehmite. In particular, the peak at or near 360 $cm^{-1}$ is high and therefore suitable for use for the ratio calculation. The calculation procedure is described below in detail.

First, a Raman spectrum of an Al hydrated oxide film 2 that consists essentially of boehmite is obtained. This Raman spectrum is used as a "reference spectrum". For instance, hydrothermal treatment is carried out at 100° C. to form an Al hydrated oxide film 2 on a surface of Al foil 1; and it is considered that the resulting Al hydrated oxide film 2, thus formed under these conditions, consists essentially of boehmite. In the reference spectrum obtained for this Al hydrated oxide film 2, a peak within the range of 310 $cm^{-1}$ to 410 $cm^{-1}$ (typically, at or near 360 $cm^{-1}$) is identified and the height thereof is measured. This height is used as a "reference peak height".

Then, a Raman spectrum of another Al hydrated oxide film 2, which is an Al hydrated oxide film 2 of interest, is obtained. In this Raman spectrum, a peak within the range of 310 $cm^{-1}$ to 410 $cm^{-1}$ (typically, at or near 360 $cm^{-1}$) is identified and the height thereof is measured. This height is divided by the "reference peak height", and the resulting value is converted into percentage. The percentage thus obtained is used as the "boehmite ratio (unit, mol %)".

The Raman spectrum is measured with a laser Raman spectrophotometer. Example measurement conditions are described below.

Apparatus: NRS-5100, a laser Raman spectrophotometer manufactured by JASCO Corporation Measurement mode: microscopic measurement (with an ×20 objective lens)

Laser wavelength: 532 nm

Laser output: 4.9 mW

Measurement wavelength range: 200 to 3400 $cm^{-1}$

The apparatus described above is merely an example. An equivalent apparatus may be used instead.

(Thickness)

The thickness of Al hydrated oxide film 2 is not smaller than 50 nm and not greater than 500 nm. With the thickness being smaller than 50 nm, the heat-generation-mitigating effect can decrease. With the thickness being greater than 500 nm, battery resistance can increase to a non-negligible extent. The smaller the thickness of Al hydrated oxide film 2 is, the lower the battery resistance may be. For example, the thickness of Al hydrated oxide film 2 may be not greater than 450 nm. For example, the thickness of Al hydrated oxide film 2 may be not greater than 350 nm. For example, the thickness of Al hydrated oxide film 2 may be not greater than 150 nm.

The smaller the thickness of Al hydrated oxide film 2 is, the smaller the amount of space occupied by Al hydrated oxide film 2 within the battery. When the thickness of Al hydrated oxide film 2 is decreased, the thickness of positive electrode active material layer 12 and the like may be increased in accordance with the decrement. This is expected to increase battery capacity.

(Method of Measuring Thickness)

The thickness of Al hydrated oxide film 2 is measured in a cross-sectional micrograph of Al hydrated oxide film 2. For example, a scanning electron microscope (SEM) may be used. For example, a transmission electron microscope (TEM) may be used. The cross section is practically parallel to the thickness direction of Al hydrated oxide film 2 (namely, the y-axis direction in FIG. 2). The expression "practically parallel to the thickness direction" means that the angle formed between the cross section and the thickness direction is not smaller than 0 degree and not greater than 10 degrees. The cross-sectional sample may be prepared by using a cross section polisher apparatus (CP) and/or a focused ion beam apparatus (FIB), for example. The magnification may be changed, as appropriate, in accordance with the thickness of Al hydrated oxide film 2. The magnification of the image may be not lower than 10,000 times and not higher than 200,000 times, for example.

Al hydrated oxide film 2 according to the present embodiment includes a needle layer, at least as a surface part thereof. In this configuration, Al hydrated oxide film 2 has a cross section that has protrusions 2p and depressions 2v. The thicknesses at ten protrusions 2p and ten depressions 2v, twenty positions in total, are measured. The arithmetic mean of these twenty measurements is used as the thickness of Al hydrated oxide film 2.

The sectional image is obtained under the conditions described below, for example.

Apparatus: SU-70, an ultrahigh-resolution analytical scanning electron microscope manufactured by Hitachi High-Technologies Corporation Observation mode: backscattered electron image Accelerating voltage: 2 kV The apparatus described above is merely an example. An equivalent apparatus may be used instead.

<<Positive Electrode Active Material Layer>>

Positive electrode active material layer 12 is formed on a surface of positive electrode current collector 11. More specifically, positive electrode active material layer 12 is formed on a surface of Al hydrated oxide film 2. The thickness of positive electrode active material layer 12 may be not smaller than 10 μm and not greater than 200 μm, for example. The thickness of positive electrode active material layer 12 may be not smaller than 100 μm and not greater than 200 μm, for example.

The density of positive electrode active material layer 12 may be not lower than 3 g/cm$^3$ and not higher than 4 g/cm$^3$, for example. The density of positive electrode active material layer 12 may be not lower than 3.5 g/cm$^3$ and not higher than 4 g/cm$^3$, for example. The density of positive electrode active material layer 12 is calculated from the apparent volume of positive electrode active material layer 12 and the mass of positive electrode active material layer 12. The apparent volume of positive electrode active material layer 12 is a product of the area of positive electrode active material layer 12 (the area of a region to which positive electrode paste is applied) and the thickness of positive electrode active material layer 12.

Positive electrode active material layer 12 contains at least a positive electrode active material. Typically, the positive electrode active material is in the form of particles. The D50 of the positive electrode active material may be not lower than 1 μm and not higher than 30 μm, for example. The "d50" refers to a particle size in volume-based particle size distribution at which the cumulative particle volume (accumulated from the side of small sizes) reaches 50% of the total particle volume. The d50 may be measured with a laser-diffraction particle size distribution analyzer, for example.

The positive electrode active material is not particularly limited. The positive electrode active material may have any of various crystal structures. The crystal structure of the positive electrode active material may be identified by x-ray diffraction (XRD), for example. The positive electrode active material may have a crystal structure of a lamellar rock salt type, a spinel type, or an olivine type, for example.

The positive electrode active material may be at least one selected from the group consisting of lithium cobalt oxide (LiCoO$_2$), lithium nickel oxide (LiNiO$_2$), lithium manganese oxide, lithium nickel cobalt manganese oxide, lithium nickel cobalt aluminate, and lithium iron phosphate (LiFePO$_4$), for example.

The lithium manganese oxide may be LiMnO$_2$ and/or LiMn$_2$O$_4$, for example. The lithium nickel cobalt manganese oxide may be LiNi$_{1/3}$Co$_{1/3}$Mn$_{1/3}$O$_2$, LiNi$_{0.5}$Co$_{0.2}$Mn$_{0.3}$O$_2$, LiNi$_{0.6}$Co$_{0.3}$Mn$_{0.1}$O$_2$, and/or LiNi$_{0.4}$Co$_{0.2}$Mn$_{0.4}$O$_2$, for example. The lithium nickel cobalt aluminate may be LiNi$_{0.82}$Co$_{0.015}$Al$_{0.03}$O$_2$, for example.

Positive electrode active material layer 12 may further contain a conductive material. The conductive material is not particularly limited. The conductive material may be at least one selected from the group consisting of acetylene black (AB), furnace black, thermal black, graphite, vapor grown carbon fiber (VGCF), and carbon nanotube (CNT), for example. The conductive material may be contained in an amount, for example, not lower than 1 part by mass and not higher than 10 parts by mass relative to 100 parts by mass of the positive electrode active material.

Positive electrode active material layer 12 may further contain a binder. The binder is not particularly limited. The binder may be at least one selected from the group consisting of polyvinylidene difluoride (PVdF), polytetrafluoroethylene (PTFE), carboxymethylcellulose (CMC), and polyacrylic acid (PAA), for example. The binder may be contained in an amount, for example, not lower than 0.1 parts by mass and not higher than 10 parts by mass relative to 100 parts by mass of the positive electrode active material.

<Method of Producing Positive Electrode>

Next, a method of producing a positive electrode according to the present embodiment is described.

Figure 4:
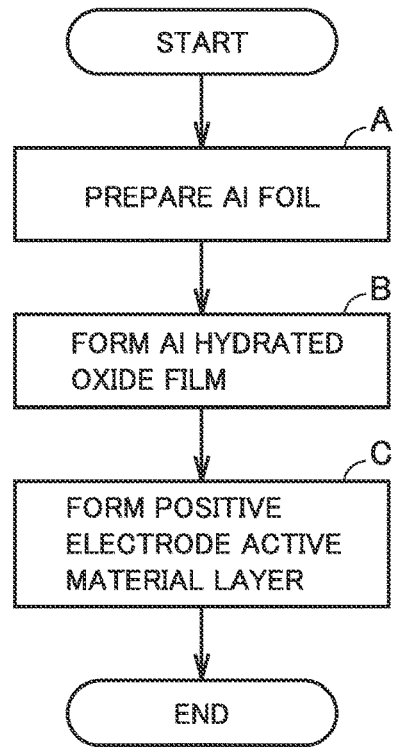
FIG. 4 is a flowchart schematically illustrating a method of producing a positive electrode according to the present embodiment.

FIG. 4 is a flowchart schematically illustrating a method of producing a positive electrode according to the present embodiment.

The method of producing a positive electrode according to the present embodiment includes at least "(A) preparing an Al foil", "(B) forming an Al hydrated oxide film", and "(C) forming a positive electrode active material layer".

<<(A) Preparing Al Foil>>

The method of producing a positive electrode according to the present embodiment includes preparing Al foil 1. Al foil 1 is described above in detail. Al foil 1 may be prepared by purchasing a commercially available Al foil 1. Al foil 1 may be produced. Al foil 1 may be produced by a conventionally known method.

<<(B) Forming Al Hydrated Oxide Film>>

The method of producing a positive electrode according to the present embodiment includes forming Al hydrated oxide film 2 on a surface of Al foil 1 to produce positive electrode current collector 11. Al hydrated oxide film 2 contains a plurality of types of Al hydrated oxides. The ratio of boehmite to the plurality of types of Al hydrated oxides is not lower than 20 mol % and not higher than 80 mol %.

(Hydrothermal Treatment)

Al hydrated oxide film 2 may be formed by hydrothermal treatment, for example. By changing the treatment temperature in the hydrothermal treatment, the boehmite ratio may be adjusted. By changing the treatment duration of the hydrothermal treatment, the thickness of Al hydrated oxide film 2 may be adjusted.

An example process is described below. A predetermined water bath is prepared. The temperature of the water bath is adjusted. Into the water bath, Al foil 1 is immersed. This may cause hydrothermal reaction to occur in a surface part of Al foil 1 and convert the surface part of Al foil 1 into Al hydrated oxide film 2. The temperature of the water bath is called the treatment temperature. The temperature of the water bath is measured with a typical thermometer. The duration for which Al foil 1 is immersed in the water bath is called the treatment duration.

The treatment temperature may be not lower than 50° C. and not higher than 85° C., for example. The lower the treatment temperature is, the lower the boehmite ratio tends to be. The treatment temperature may be not higher than 80° C., for example. The treatment temperature may be not lower than 60° C. and not higher than 70° C., for example.

The treatment duration may be not shorter than 80 seconds and not longer than 1200 seconds, for example. The shorter the treatment duration is, the smaller the thickness of Al hydrated oxide film 2 tends to be. The treatment duration may be not longer than 600 seconds, for example. The treatment duration may be not longer than 480 seconds, for example. The treatment duration may be not shorter than 240 seconds and not longer than 300 seconds, for example.

It should be noted that Al hydrated oxide film 2 tends to grow faster as the boehmite ratio increases. Therefore, it is desirable that the treatment duration be selected in accordance with the boehmite ratio. In Japanese Patent Laying-Open No. 2008-103132, an aqueous alkali solution is used in the treatment. When an aqueous alkali solution is used in the treatment, boehmite production may be promoted and the boehmite ratio may exceed 80 mol %.

<<(C) Forming Positive Electrode Active Material Layer>>

The method of producing a positive electrode according to the present embodiment includes forming positive electrode active material layer 12 on a surface of positive electrode current collector 11 to produce positive electrode 10.

Positive electrode active material layer 12 may be formed by, for example, applying a positive electrode paste. An example process is described below. A positive electrode active material, a conductive material, a binder, and a solvent are mixed, and thus a positive electrode paste may be prepared. The resulting positive electrode paste is applied to a surface of positive electrode current collector 11, followed by drying, and thus positive electrode active material layer 12 may be formed. The applying may be carried out with a typical applicator. The drying may be carried out with a typical dryer. The positive electrode active material and the like are described above in detail. Positive electrode active material layer 12 may be formed across a predetermined region on a surface of positive electrode current collector 11 in accordance with the specifications of a battery 100.

After positive electrode active material layer 12 is formed (namely, after the positive electrode paste is dried), positive electrode 10 may be compressed. Compression of positive electrode 10 may be carried out with rollers, for example. Compressing positive electrode 10 may make part of the conductive material contained within positive electrode active material layer 12 enter the space within Al hydrated oxide film 2. In this way, an electronic conduction path may be formed between positive electrode active material layer 12 and Al foil 1.

The compressing may also serve the purpose of adjusting the thickness of Al hydrated oxide film 2. The thickness of Al hydrated oxide film 2 may be adjusted by, for example, changing the linear pressure of the rollers. The linear pressure may be not lower than 10 t/cm and not higher than 11 t/cm, for example.

Positive electrode 10 may be cut into predetermined planar dimensions in accordance with the specifications of battery 100. In this way, positive electrode 10 according to the present embodiment may be produced.

<Non-Aqueous Electrolyte Secondary Battery>

Next, a non-aqueous electrolyte secondary battery according to the present embodiment is described.

Figure 5:
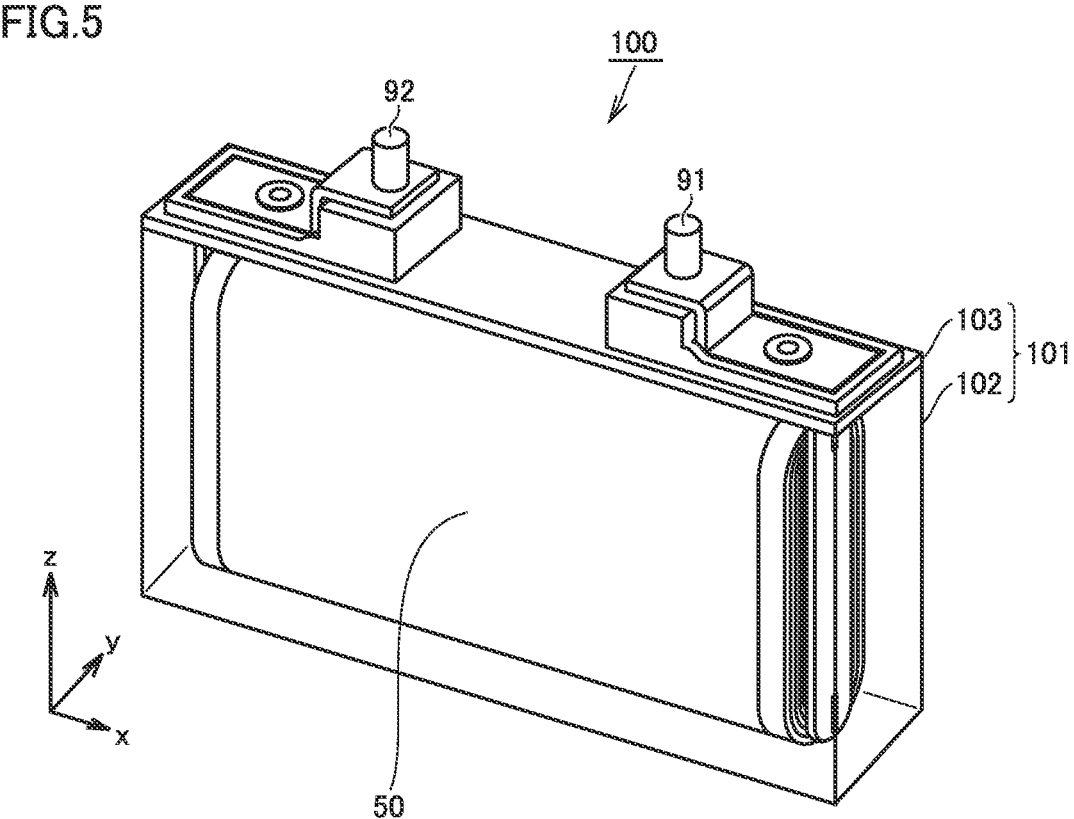
FIG. 5 is a schematic view illustrating the structure of a non-aqueous electrolyte secondary battery according to the present embodiment.

FIG. 5 is a schematic view illustrating the structure of a non-aqueous electrolyte secondary battery according to the present embodiment.

Battery 100 is a non-aqueous electrolyte secondary battery. Battery 100 includes a casing 101. Casing 101 may be made of Al alloy, for example. Casing 101 is hermetically sealed. Casing 101 accommodates an electrode array 50 and a non-aqueous electrolyte (not shown). Casing 101 is prismatic (a flat, rectangular parallelepiped). However, casing 101 may be cylindrical or the like. Casing 101 may be, for example, a pouch made of an aluminum-laminated film.

Figure 6:
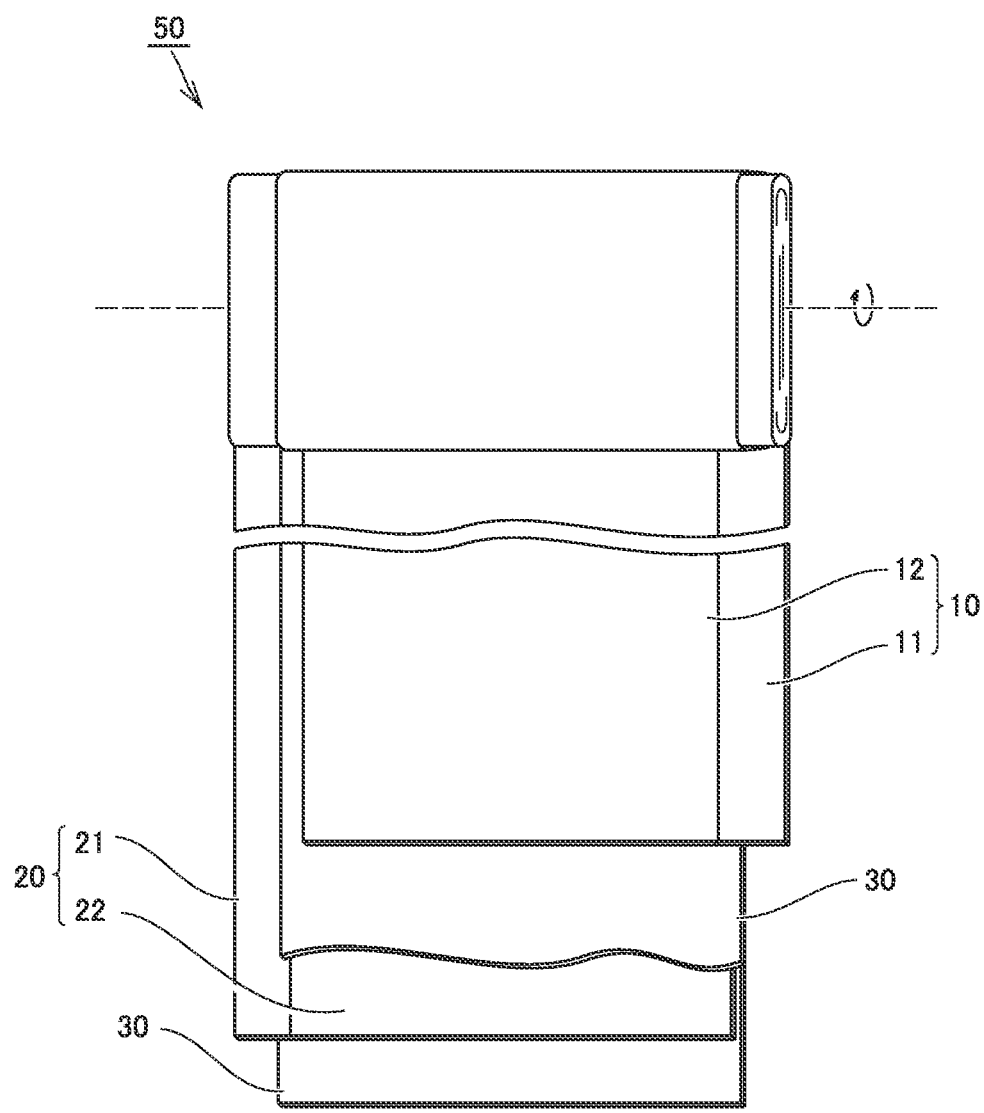
FIG. 6 is a schematic view illustrating the structure of an electrode array according to the present embodiment.

FIG. 6 is a schematic view illustrating the structure of an electrode array according to the present embodiment.

Electrode array 50 is a wound-type one. Electrode array 50 is formed by stacking positive electrode 10, a separator 30, a negative electrode 20, and separator 30 in this order and then winding them in a spiral fashion. In other words, battery 100 includes at least positive electrode 10, negative electrode 20, and the non-aqueous electrolyte. Positive electrode 10 is described above in detail. With battery 100 thus including positive electrode 10 according to the present embodiment, heat generation occurring upon an external input may be decreased.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

<<Negative Electrode>>

Figure 7:
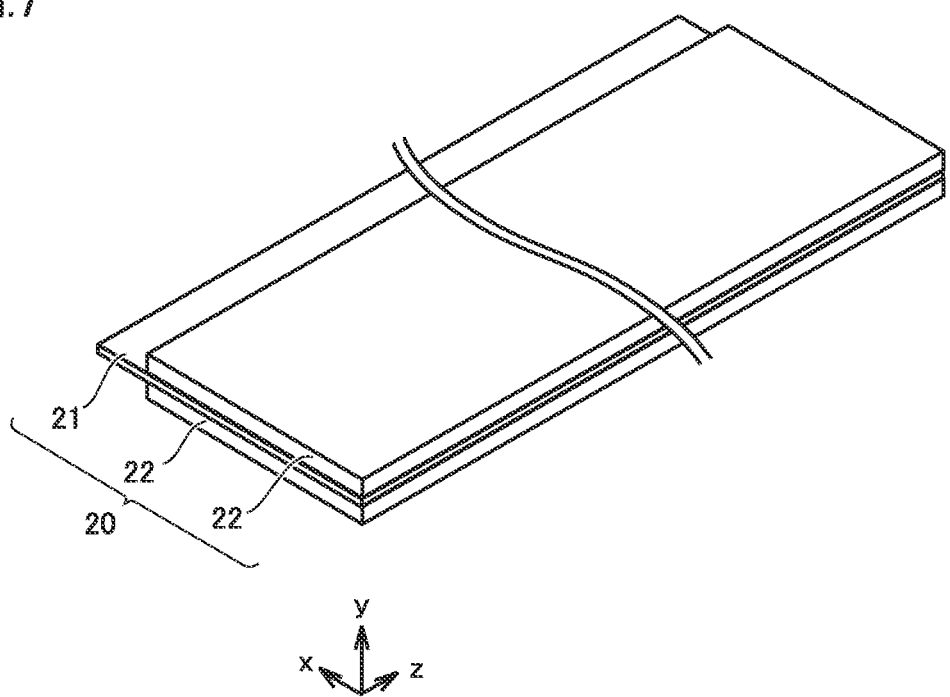
FIG. 7 is a schematic view illustrating the structure of a negative electrode according to the present embodiment.

FIG. 7 is a schematic view illustrating the structure of the negative electrode according to the present embodiment.

Negative electrode 20 is in sheet form. Negative electrode 20 includes a negative electrode current collector 21 and a negative electrode active material layer 22. Negative electrode active material layer 22 is disposed on a surface of negative electrode current collector 21. Negative electrode active material layer 22 may be disposed on only one side of the negative electrode current collector. Negative electrode active material layer 22 may be disposed on both sides of negative electrode current collector 21.

Negative electrode current collector 21 may be a copper (Cu) foil, for example. The thickness of negative electrode current collector 21 may be not smaller than 5 μm and not greater than 50 μm, for example. The part of negative electrode current collector 21 protruding from negative electrode active material layer 22 in the x-axis direction in FIG. 7 may be used for connection to a negative electrode terminal 92 (FIG. 5).

The thickness of negative electrode active material layer 22 may be not smaller than 10 μm and not greater than 200 μm, for example. Negative electrode active material layer 22 contains at least a negative electrode active material. Negative electrode active material layer 22 may further contain a binder.

Typically, the negative electrode active material is in the form of particles. The D50 of the negative electrode active material may be not lower than 1 μm and not higher than 30 μm, for example. The negative electrode active material is not particularly limited. The negative electrode active material may be at least one selected from the group consisting of graphite, soft carbon, hard carbon, silicon, silicon oxide, silicon-based alloy, tin, tin oxide, tin-based alloy, and lithium titanium oxide, for example.

The binder is not particularly limited. The binder may be CMC and/or styrene-butadiene rubber (SBR), for example. The binder may be contained in an amount, for example, not lower than 0.1 parts by mass and not higher than 10 parts by mass relative to 100 parts by mass of the negative electrode active material.

<<Separator>>

Battery 100 may include separator 30. Separator 30 is interposed between positive electrode 10 and negative electrode 20. Separator 30 separates positive electrode 10 from negative electrode 20. Separator 30 is a porous film. Separator 30 is electrically insulating. The thickness of separator 30 may be not smaller than 5 µm and not greater than 50 µm, for example. Separator 30 may be made of polyolefin, for example.

Separator 30 may be made of polyethylene (PE), for example. Separator 30 may be made of polypropylene (PP), for example. Separator 30 may have a monolayer structure, for example. Separator 30 may consist of a porous PE film, for example. Separator 30 may have a multilayer structure, for example. Separator 30 may be formed by, for example, stacking a porous PP film, a porous PE film, and a porous PP film in this order. Separator 30 may have a heat-resistant layer on a surface thereof. The heat-resistant layer contains a heat-resistant material. The heat-resistant material may be alumina, boehmite, titania, silica, and/or polyimide, for example.

When the non-aqueous electrolyte is solid (in other words, when battery 100 is an all-solid-state battery), separator 30 may be practically unnecessary.

<<Non-Aqueous Electrolyte>>

Battery 100 includes a non-aqueous electrolyte. The non-aqueous electrolyte according to the present embodiment is a Li-ion conductor. The non-aqueous electrolyte may be liquid, for example. The non-aqueous electrolyte may be gel, for example. The non-aqueous electrolyte may be solid, for example. When the non-aqueous electrolyte is liquid, the liquid non-aqueous electrolyte may be an electrolyte solution or an ionic liquid, for example. In the present specification, the non-aqueous electrolyte in the form of electrolyte solution is described as an example.

The electrolyte solution contains at least a Li salt and a solvent. The Li salt is dissolved in the solvent. The concentration of the Li salt may be not lower than 0.5 mol/L and not higher than 2 mol/L (not lower than 0.5 M and not higher than 2 M), for example. The Li salt may be at least one selected from the group consisting of $LiPF_6$, $LiBF_4$, $LiN(FSO_2)_2$, and $LiN(CF_3SO_2)_2$, for example.

The solvent is aprotic. The solvent may be a mixture of a cyclic carbonate and a chain carbonate, for example. The mixing ratio may be "(cyclic carbonate):(chain carbonate)= 1:9 to 5:5 (volume ratio)", for example.

The cyclic carbonate may be at least one selected from the group consisting of ethylene carbonate (EC), propylene carbonate (PC), butylene carbonate (BC), and fluoroethylene carbonate (FEC), for example.

The chain carbonate may be at least one selected from the group consisting of dimethyl carbonate (DMC), ethyl methyl carbonate (EMC), and diethyl carbonate (DEC), for example.

The solvent may contain a lactone, a cyclic ether, a chain ether, and/or a carboxylate ester, for example. The lactone may be γ-butyrolactone (GBL) and/or δ-valerolactone (DVL), for example. The cyclic ether may be tetrahydrofuran (THF), 1,3-dioxolane (DOL), and/or 1,4-dioxane (DX), for example. The chain ether may be 1,2-dimethoxyethane (DME), for example. The carboxylate ester may be methyl formate (MF), methyl acetate (MA), and/or methyl propionate (MP) may be, for example.

In addition to the Li salt and the solvent, the electrolyte solution may further contain various additive agents. The concentration of the additive agents may be not lower than 0.005 mol/L and not higher than 0.5 mol/L, for example. The additive agents may be a gas generation agent (the so-called anti-overcharging additive), a solid electrolyte interface (SEI) film-forming agent, and a flame retardant, for example.

The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiBF_2(C_2O_4)$, $LiPF_2(C_2O_4)_2$, $LiPO_2F_2$, propane sultone (PS), and/or ethylene sulfite (ES), for example. The flame retardant may be phosphazene, for example. The electrolyte solution may contain only one type of the additive agents. The electrolyte solution may contain two or more types of the additive agents.

EXAMPLES

Next, examples according to the present disclosure are described. However, the description below does not limit the scope of claims.

<Producing Positive Electrode and Non-Aqueous Electrolyte Secondary Battery>

Example 1

1. Producing Positive Electrode
1-1. (A) Preparing Al Foil

Al foil 1 having a belt shape (Alloy No. 1085, with a thickness of 15 µm) was prepared. Al foil 1 had a width dimension (the dimension in the x-axis direction in FIG. 1) of 130 mm.

1-2. (B) Forming Al Hydrated Oxide Film

A water bath for hydrothermal treatment was prepared. The temperature of the water bath was adjusted to 70° C. Al foil 1 was immersed in the water bath for 300 seconds. In other words, the treatment temperature was 70° C. and the treatment duration was 300 seconds. Thus, Al hydrated oxide film 2 was formed on a surface of Al foil 1. In this way, positive electrode current collector 11 was produced.

1-3. (C) Forming Positive Electrode Active Material Layer

The materials described below were prepared.

Positive electrode active material: lamellar-rock-salt-type lithium nickel cobalt manganese oxide
Conductive material: acetylene black (powder)
Binder: PVdF
Solvent: N-methyl-2-pyrrolidone The positive electrode active material, the conductive material, the binder, and the solvent were mixed, and thus a positive electrode paste was prepared. The resulting positive electrode paste was applied to a surface of positive electrode current collector 11 (on both sides), followed by drying, and thus positive electrode active material layer 12 was formed. In this way, positive electrode 10 was produced. The resulting positive electrode 10 was a belt-shaped sheet. Positive electrode 10 was compressed with rollers. The linear pressure of the rollers was 11 t/cm.

The composition of positive electrode active material layer 12 was as follows:

(Positive electrode active material):(conductive material): (binder)=98:1:1 (mass ratio).

The mass per unit area of positive electrode active material layer 12 was 25 mg/cm². The width dimension of positive electrode active material layer 12 (the dimension in the x-axis direction in FIG. 1) was 110 mm. The density of positive electrode active material layer 12 was 3.7 g/cm³.

2. Producing Negative Electrode

The materials described below were prepared.
Negative electrode active material: natural graphite
Binder: CMC and SBR
Solvent: ion-exchanged water
Negative electrode current collector: belt-shaped Cu foil (10 μm in thickness, 132 mm in width dimension)

The width dimension herein refers to the dimension in the x-axis direction in FIG. 7.

The negative electrode active material, the binder, and the solvent were mixed, and thus a negative electrode paste was prepared. The resulting negative electrode paste was applied to a surface of negative electrode current collector 21 (on both sides), followed by drying, and thus negative electrode active material layer 22 was formed. The mass per unit area of the resulting negative electrode active material layer 22 was 20 mg/cm². The width dimension of negative electrode active material layer 22 (the dimension in the x-axis direction in FIG. 7) was 112 mm. In this way, negative electrode 20 was produced. The resulting negative electrode 20 was a belt-shaped sheet.

3. Preparing Separator

As separator 30, a porous PE film (120 mm in width dimension, 20 μm in thickness) was prepared. As a heat-resistant material, alumina (powder) was prepared. The heat-resistant material, a binder, and a solvent were mixed, and thus a paste was prepared. The resulting paste was applied to a surface of separator 30, followed by drying, and thus a heat-resistant layer was formed. The thickness of the resulting heat-resistant layer was 4 μm. In this way, separator 30 was prepared.

4. Preparing Electrolyte Solution

An electrolyte solution was prepared. The electrolyte solution consisted of components described below.
Li salt: $LiPF_6$ (concentration, 1 mol/L)
Solvent: [EC:EMC:DEC=3:4:3 (volume ratio)]

5. Assembly

Positive electrode 10, separator 30, negative electrode 20, and separator 30 were stacked in this order and then wound in a spiral fashion. Thus, electrode array 50 was formed.

Casing 101 was prepared. Casing 101 was prismatic. Casing 101 had the following outer dimensions: 75 mm in height dimension, 120 mm in width dimension, and 15 mm in depth dimension. The height dimension refers to the dimension in the z-axis direction in FIG. 5. The width dimension refers to the dimension in the x-axis direction in FIG. 5. The depth dimension refers to the dimension in the y-axis direction in FIG. 5. The wall thickness of casing 101 was 1 mm.

To electrode array 50, positive electrode terminal 91 and negative electrode terminal 92 were connected. Electrode array 50 was placed in casing 101. Into casing 101, the electrolyte solution was injected. Casing 101 was hermetically sealed. In this way, battery 100 (non-aqueous electrolyte secondary battery) was produced. Battery 100 included at least positive electrode 10, negative electrode 20, and the non-aqueous electrolyte. Battery 100 was designed to have a rated capacity of 5 Ah within a voltage range of 3.0 to 4.1 V.

6. Charge and Discharge for Completing Battery Production

Battery 100 was charged to 4.2 V at a rate of 1 C in an environment at a temperature of 25° C. At a rate of 1 C, charging to the rated capacity completes in one hour. After five minutes of resting, battery 100 was discharged to 3.0 V at a rate of 1 C.

Then, the initial capacity of battery 100 was determined by carrying out charging in the constant current-constant voltage (CC-CV) mode and discharging in the CC-CV mode, as specified below.

Charging in CC-CV mode: CC=1 C, CV=4.1 V, cut-off current=0.01 C
Discharging in CC-CV mode: CC=1 C, CV=3.0 V, cut-off current=0.01 C Comparative Example 1

Positive electrode 10 and battery 100 were produced in the same manner as in Example 1 except that untreated Al foil 1 was used as positive electrode current collector 11. Positive electrode current collector 11 in Comparative Example 1 did not include Al hydrated oxide film 2.

Examples 2 to 9, Comparative Examples 2 to 5

Positive electrode 10 and battery 100 were produced in the same manner as in Example 1 except that the treatment temperature and the treatment duration in hydrothermal treatment were changed as specified in Table 1 below.

<Evaluation>

<<Boehmite Ratio>>

A Raman spectrum of Al hydrated oxide film 2 of each example was obtained in the manner described above. Then, the boehmite ratio was calculated. Results are shown in Table 1 below.

Figure 8:
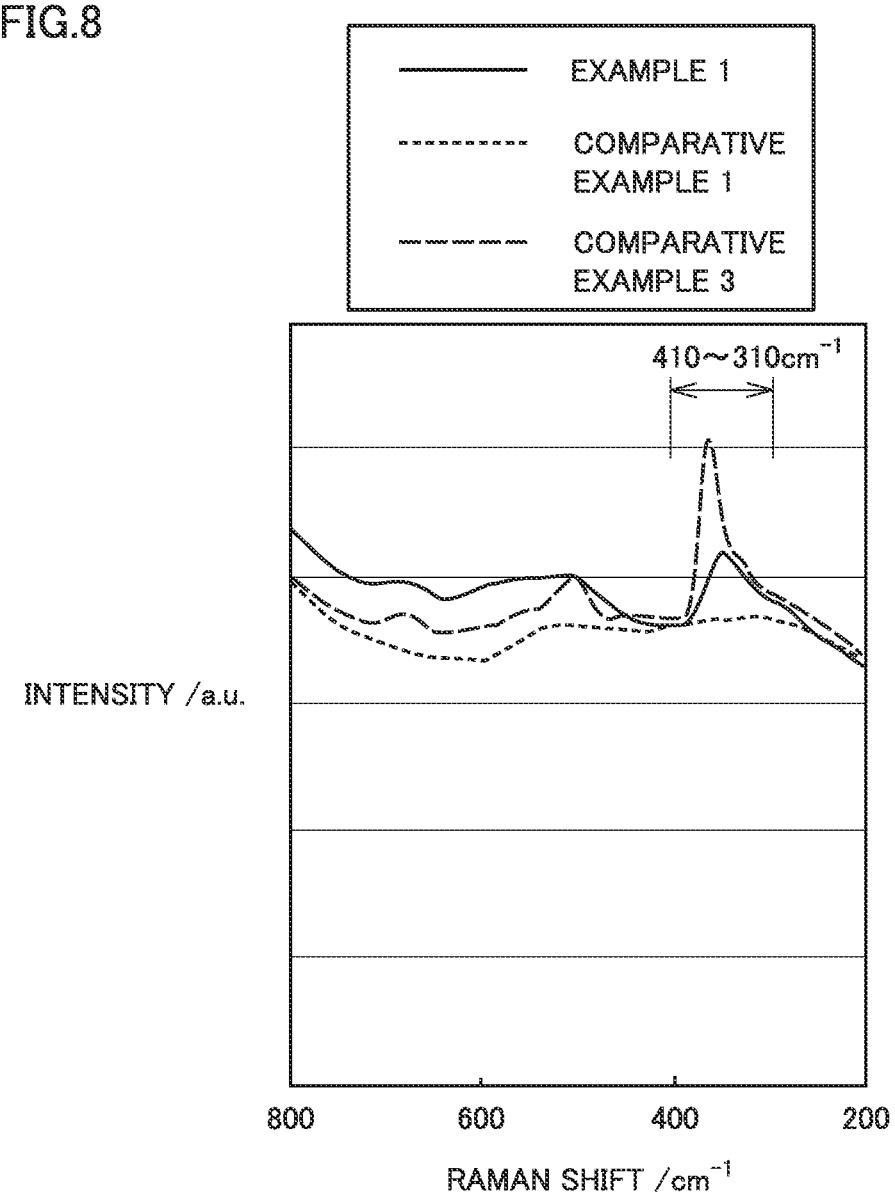
FIG. 8 illustrates Raman spectra of Example 1, Comparative Example 1, and Comparative Example 3.

FIG. 8 illustrates Raman spectra of Example 1, Comparative Example 1, and Comparative Example 3.

In Comparative Example 1, Al hydrated oxide film 2 was not formed. The Raman spectrum of Comparative Example 1 has no peak at or near 360 cm⁻¹.

In Comparative Example 3, hydrothermal treatment was carried out in a water bath at 90° C. The Raman spectrum of Comparative Example 3 has a high peak at or near 360 cm⁻¹. It is considered that Al hydrated oxide film 2 of Comparative Example 3 had a high boehmite ratio.

In Example 1, hydrothermal treatment was carried out in a water bath at 70° C. The peak at or near 360 cm⁻¹ in the Raman spectrum of Example 1 is lower than that of Comparative Example 3. It may be because the boehmite ratio of Example 1 is lower than the boehmite ratio of Comparative Example 3.

<<Battery Resistance>>

The state of charge (SOC) of battery 100 was adjusted to 50%. Battery 100 was discharged at a rate of 10 C for ten seconds. The level of voltage drop caused in the ten seconds elapsed after the start of the discharging was measured. Based on the relation between the level of voltage drop and the rate, the battery resistance was calculated. Results are shown in column "Battery resistance" in Table 1 below. When the battery resistance was 3.8 mΩ or lower in an example of the present disclosure, it is regarded that a rise in battery resistance was mitigated.

<<Nail penetration test>>

The SOC of battery 100 was adjusted to 100%. A nail was prepared. The nail had a shank diameter of 3 mm and an R value of 1 mm at the tip. The nail was driven into battery 100 at a rate of 1 mm/s. One second after the nail was driven, the surface temperature of battery 100 was measured. Results are shown in column "One-second-later temperature" in Table 1 below. It is considered that, the lower the one-second-later temperature was, the more mitigated the heat generation occurring upon an external input was.

TABLE 1

| | Positive electrode | | | | | | | |
|---|---|---|---|---|---|---|---|---|
| | Positive electrode current collector | | | | | Positive | | |
| | | Al hydrated oxide film | | | | electrode active | | Evaluation |
| | | Hydrothermal treatment | | | | material layer | Battery | One-second-later |
| | Al foil | Treatment | Treatment | Boehmite | | | | |
| | Alloy No. | Thickness [μm] | temperature [° C.] | duration [second] | ratio [mol %] | Thickness [nm] | Density [g/cm³] | resistance [mΩ] | temperature in nail penetration test [° C.] |
| Ex. 1 | 1085 | 15 | 70 | 300 | 50 | 150 | 3.7 | 3.5 | 300 |
| Ex. 2 | 1085 | 15 | 50 | 720 | 20 | 150 | 3.7 | 3.5 | 320 |
| Ex. 3 | 1085 | 15 | 60 | 540 | 30 | 150 | 3.7 | 3.5 | 300 |
| Ex. 4 | 1085 | 15 | 80 | 100 | 70 | 150 | 3.7 | 3.5 | 320 |
| Ex. 5 | 1085 | 15 | 85 | 80 | 80 | 150 | 3.7 | 3.5 | 350 |
| Ex. 6 | 1085 | 15 | 70 | 240 | 50 | 50 | 3.7 | 3.5 | 360 |
| Ex. 7 | 1085 | 15 | 70 | 480 | 50 | 350 | 3.7 | 3.6 | 300 |
| Ex. 8 | 1085 | 15 | 70 | 600 | 50 | 450 | 3.7 | 3.6 | 300 |
| Ex. 9 | 1085 | 15 | 70 | 1200 | 50 | 500 | 3.7 | 3.8 | 300 |
| Comp. Ex. 1 | 1085 | 15 | — | — | 0 | 0 | 3.7 | 3.5 | 800 |
| Comp. Ex. 2 | 1085 | 15 | 45 | 1080 | 15 | 150 | 3.7 | 3.5 | 600 |
| Comp. Ex. 3 | 1085 | 15 | 90 | 60 | 90 | 150 | 3.7 | 3.5 | 700 |
| Comp. Ex. 4 | 1085 | 15 | 70 | 180 | 50 | 40 | 3.7 | 3.5 | 800 |
| Comp. Ex. 5 | 1085 | 15 | 70 | 1800 | 50 | 550 | 3.7 | 5.5 | 300 |

<Results>

Examples 1 to 5, Comparative Examples 1 to 3

Examples 1 to 5 and Comparative Examples 2 and 3 had different boehmite ratios. Examples 1 to 5 and Comparative Examples 2 and 3 had the same thickness. In Comparative Example 1, Al hydrated oxide film 2 was not formed.

Figure 9:
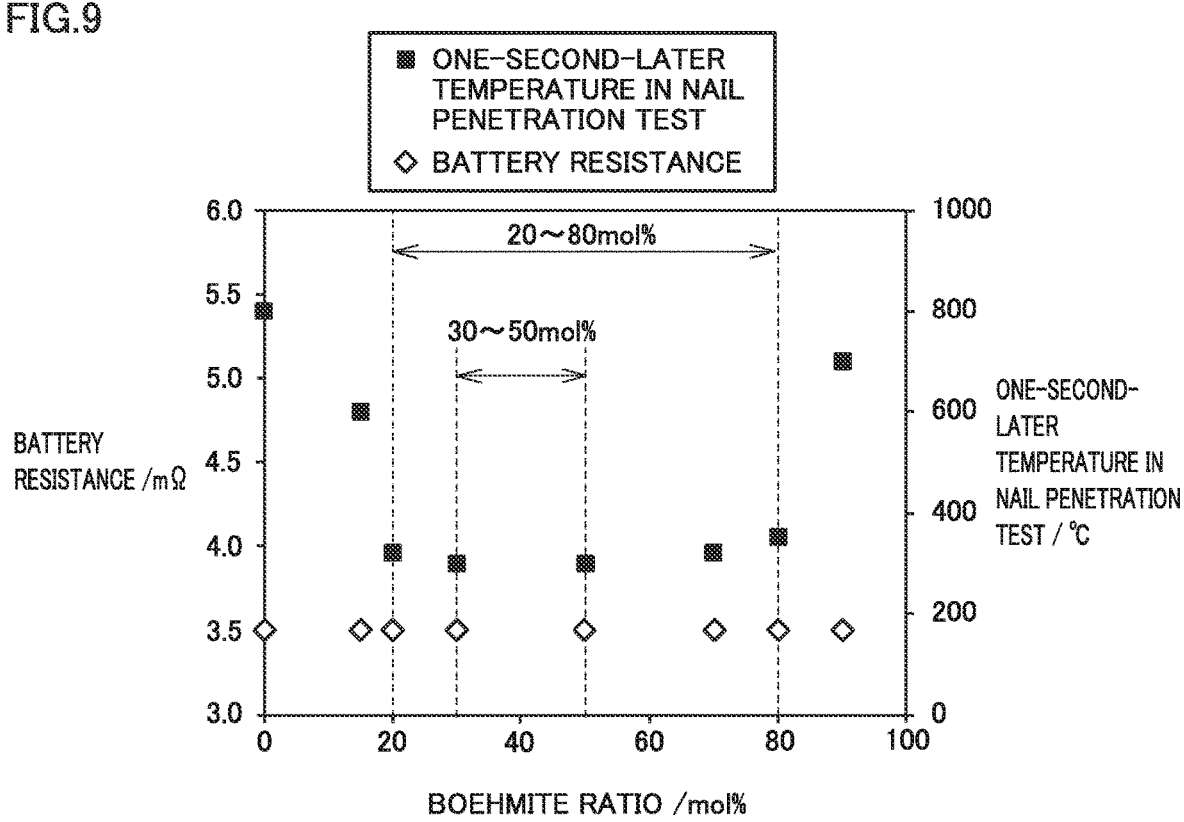
FIG. 9 is a graph illustrating the relation of both a battery resistance and a one-second-later temperature to a boehmite ratio.

FIG. 9 is a graph illustrating the relation of both a battery resistance and a one-second-later temperature to a boehmite ratio. FIG. 9 illustrates results from Examples 1 to 5 and Comparative Examples 1 to 3. The battery resistance was substantially the same despite the differences in the boehmite ratio. Therefore, the boehmite ratio may not practically have affected the electrical resistance of Al hydrated oxide film 2. In the examples of the present disclosure, the conductive material may have permeated into Al hydrated oxide film 2 and formed an electronic conduction path between positive electrode active material layer 12 and Al foil 1. As long as the thickness of Al hydrated oxide film 2 was the same, the extent of permeation of the conductive material may have been substantially the same. The extent of permeation of the conductive material thus being substantially the same may be the reason why the battery resistance was substantially the same.

When the boehmite ratio was higher than 80 mol %, the one-second-later temperature in the nail penetration test was remarkably high. It may be because Al hydrated oxide film 2 was low in flexibility and therefore readily cracked.

When the boehmite ratio was lower than 20 mol %, the one-second-later temperature in the nail penetration test was remarkably high. It may be because the components other than boehmite were high in crystallinity and therefore Al hydrated oxide film 2 was low in flexibility.

When the boehmite ratio was within the range of 30 mol % to 50 mol %, the one-second-later temperature in the nail penetration test tended to be low.

Examples 1 and 6 to 9, Comparative Examples 1, 4, and 5

Examples 1 and 6 to 9 and Comparative Examples 4 and 5 had different thicknesses. Examples 1 and 6 to 9 and Comparative Examples 4 and 5 had the same boehmite ratio. In Comparative Example 1, Al hydrated oxide film 2 was not formed.

Figure 10:
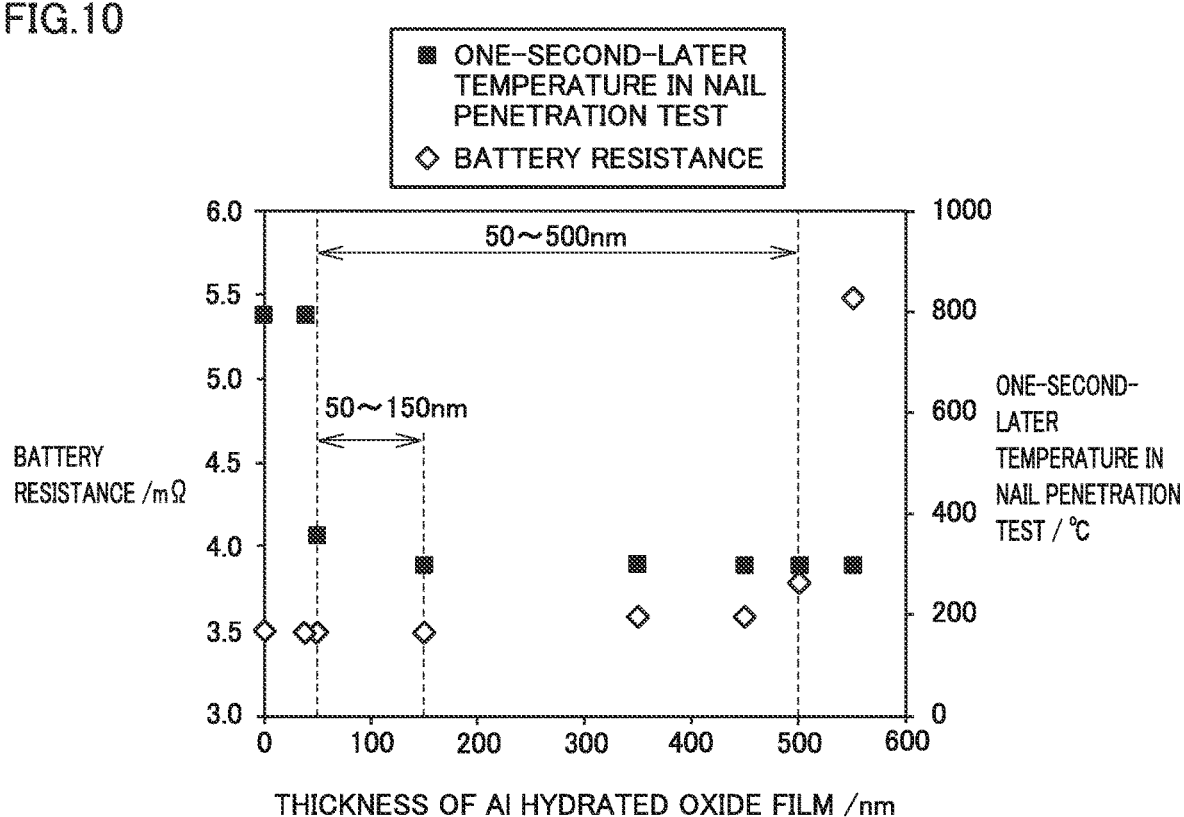
FIG. 10 is a graph illustrating the relation of both a battery resistance and a one-second-later temperature to a thickness.

FIG. 10 is a graph illustrating the relation of both a battery resistance and a one-second-later temperature to a thickness. FIG. 10 illustrates results from Examples 1 and 6 to 9 and Comparative Examples 1, 4, and 5. When the thickness was greater than 500 nm, battery resistance was remarkably high. It may be because electronic conduction paths were not formed between positive electrode active material layer 12 and Al foil 1 in a sufficient amount.

When the thickness was smaller than 50 nm, the one-second-later temperature in the nail penetration test was remarkably high. It may be because Al hydrated oxide film 2 was too thin and therefore Al foil 1 was readily exposed.

When the thickness was 150 nm or smaller, battery resistance tended to be low.

The embodiments and examples disclosed herein are illustrative and non-restrictive in any respect. The technical scope indicated by the claims encompasses any modifications within the scope and meaning equivalent to the terms of the claims.

What is claimed is:

1. A positive electrode for a non-aqueous electrolyte secondary battery, the positive electrode comprising at least:
   a positive electrode current collector; and
   a positive electrode active material layer,
   the positive electrode active material layer being disposed on a surface of the positive electrode current collector,
   the positive electrode current collector including an aluminum foil and an aluminum hydrated oxide film,
   the aluminum hydrated oxide film covering a surface of the aluminum foil,
   the aluminum hydrated oxide film having a thickness not smaller than 50 nm and less than 450 nm,
   the aluminum hydrated oxide film consisting of not lower than 30 mol % and not higher than 50 mol % boehmite, and a remainder including at least one of diaspore, bayerite, and gibbsite.

2. The positive electrode according to claim 1, wherein the aluminum hydrated oxide film has a thickness not greater than 150 nm.

3. A non-aqueous electrolyte secondary battery comprising at least:
- the positive electrode according to claim 1;
- a negative electrode; and
- a non-aqueous electrolyte.

4. The positive electrode according to claim 1, wherein the aluminum hydrated oxide film has a thickness of not more than 350 nm.

* * * * *